United States Patent
Gupta et al.

(10) Patent No.: US 11,374,814 B2
(45) Date of Patent: Jun. 28, 2022

(54) NETWORK DEVICE CONFIGURATION UPDATE USING RANK AND HEALTH

(71) Applicant: HEWLETT PACKARD ENTERPRISE DEVELOPMENT LP, Houston, TX (US)

(72) Inventors: Gopal Gupta, Bangalore (IN); Gopal Agarwal, Bangalore (IN); Avadhesh Karia, Bangalore (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 16/529,598

(22) Filed: Aug. 1, 2019

(65) Prior Publication Data
US 2021/0036913 A1   Feb. 4, 2021

(51) Int. Cl.
| | |
|---|---|
| *H04L 41/082* | (2022.01) |
| *H04L 41/0893* | (2022.01) |
| *G06F 15/173* | (2006.01) |
| *G06F 9/445* | (2018.01) |
| *H04L 12/24* | (2006.01) |
| *H04L 41/0869* | (2022.01) |
| *G06F 8/65* | (2018.01) |

(52) U.S. Cl.
CPC .............. *H04L 41/082* (2013.01); *G06F 8/65* (2013.01); *H04L 41/0869* (2013.01)

(58) Field of Classification Search
CPC ... H04L 41/082; H04L 41/0869; H04L 47/24; G06F 8/65
USPC ......................................................... 709/221
See application file for complete search history.

(56) References Cited

U.S. PATENT DOCUMENTS

| | | | |
|---|---|---|---|
| 5,809,282 A | * | 9/1998 | Cooper ............... H04L 41/0823 700/49 |
| 5,819,028 A | | 10/1998 | Manghirmalani et al. |
| 7,039,688 B2 | | 5/2006 | Matsuda et al. |

(Continued)

OTHER PUBLICATIONS

Upgrade Network Devices to the Latest Version Through FindIT Network Management, (Research Paper), Dec. 12, 2018, 9 Pgs.

(Continued)

*Primary Examiner* — Jason D Recek
*Assistant Examiner* — Golam Mahmud
(74) *Attorney, Agent, or Firm* — Sheppard Mullin Richter & Hampton LLP

(57) ABSTRACT

Systems and methods are provided for network device configuration update. A method includes selecting a group of network devices to receive a configuration update; ranking the network devices according to an importance; updating each of the network devices in order of the ranking, from least important to most important, comprising: generating a first health score for the network device, the first health score representing a performance level of the network device prior to the configuration update; updating a configuration of the network device according to the configuration update subsequent to generating the first health score; generating a second health score for the updated network device subsequent to updating the configuration of the network device; and responsive to the second health score being lower than the first health score by more than a predetermined score threshold, rolling back the configuration update for the network devices that have been updated.

20 Claims, 7 Drawing Sheets

(56) References Cited

U.S. PATENT DOCUMENTS

| | | | |
|---|---|---|---|
| 7,673,008 B2 | 3/2010 | Kojima | |
| 8,830,913 B1* | 9/2014 | Sosa | H04M 1/72406 370/328 |
| 8,856,315 B2 | 10/2014 | Tyree et al. | |
| 8,880,690 B1* | 11/2014 | Kennedy | H04L 41/0823 709/224 |
| 9,311,066 B1* | 4/2016 | Garman | G06F 8/60 |
| 9,904,535 B2* | 2/2018 | Gross | H04B 3/52 |
| 9,973,385 B2* | 5/2018 | Wright | G06F 9/44505 |
| 10,439,941 B2* | 10/2019 | Kamath | H04L 43/0876 |
| 10,680,852 B2* | 6/2020 | Agarwal | H04L 12/4641 |
| 10,742,501 B1* | 8/2020 | Pianigiani | H04L 41/082 |
| 11,163,669 B1* | 11/2021 | Torun | G06F 11/3688 |
| 2002/0039352 A1* | 4/2002 | El-Fekih | H04L 47/822 370/252 |
| 2006/0190521 A1* | 8/2006 | Kojima | G06F 15/16 709/200 |
| 2010/0146148 A1* | 6/2010 | Schwimer | H04L 41/22 709/238 |
| 2010/0162036 A1* | 6/2010 | Linden | G06F 11/181 714/4.11 |
| 2014/0258479 A1 | 9/2014 | Tenginakai et al. | |
| 2015/0381407 A1* | 12/2015 | Wang | H04L 41/0663 370/221 |
| 2016/0105359 A1* | 4/2016 | Kim | H04L 43/04 370/252 |
| 2016/0110322 A1* | 4/2016 | Miller | G06F 3/048 715/758 |
| 2016/0153806 A1 | 6/2016 | Ciasulli et al. | |
| 2016/0378615 A1* | 12/2016 | Cohen | G06F 11/3055 714/19 |
| 2018/0285086 A1* | 10/2018 | O'Malley | H04L 67/303 |
| 2018/0293152 A1* | 10/2018 | Sherafat Kazemzadeh | G06F 11/368 |
| 2019/0036781 A1* | 1/2019 | Prabhu | H04L 67/12 |
| 2019/0138964 A1* | 5/2019 | Morita | G06F 11/3006 |
| 2019/0173909 A1* | 6/2019 | Mixer | H04L 63/1441 |
| 2019/0322298 A1* | 10/2019 | Mong | H04L 67/12 |
| 2019/0361868 A1* | 11/2019 | Rogynskyy | G06F 16/2379 |
| 2020/0004526 A1* | 1/2020 | Weiler | G06F 8/654 |
| 2020/0119925 A1 | 4/2020 | Wang | |
| 2020/0119979 A1* | 4/2020 | Woodland | H04L 41/082 |
| 2020/0134861 A1 | 4/2020 | Zucker et al. | |
| 2020/0155944 A1 | 5/2020 | Witchey et al. | |
| 2020/0241866 A1* | 7/2020 | Gupta | G06F 8/65 |

OTHER PUBLICATIONS

Dobre et al., "Authentication of JPEG Images on the Blockchain", International Conference On Control, Artificial Intelligence, Robotics and Optimization—ICCAIRO, Research Gate, May 19-21, 2018, 12 pages.

Poudel et al., "Photograph Ownership and Authorization using Blockchain", 2019 Artificial Intelligence for Transforming Business and Society (AITB), 2019.

Victoria L. Lemieux, "Blockchain and Distributed Ledgers as Trusted Record keeping Systems: An Archival Theoretic Evaluation Framework", Future Technologies Conference (FTC) 2017, pp. 1-11.

* cited by examiner

NETWORK DEVICE CONFIGURATION UPDATE USING RANK AND HEALTH

DESCRIPTION OF RELATED ART

The disclosed technology relates generally to data communication networks, and more particularly some embodiments relate to updating the configurations of network devices in such networks.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Figure 1:
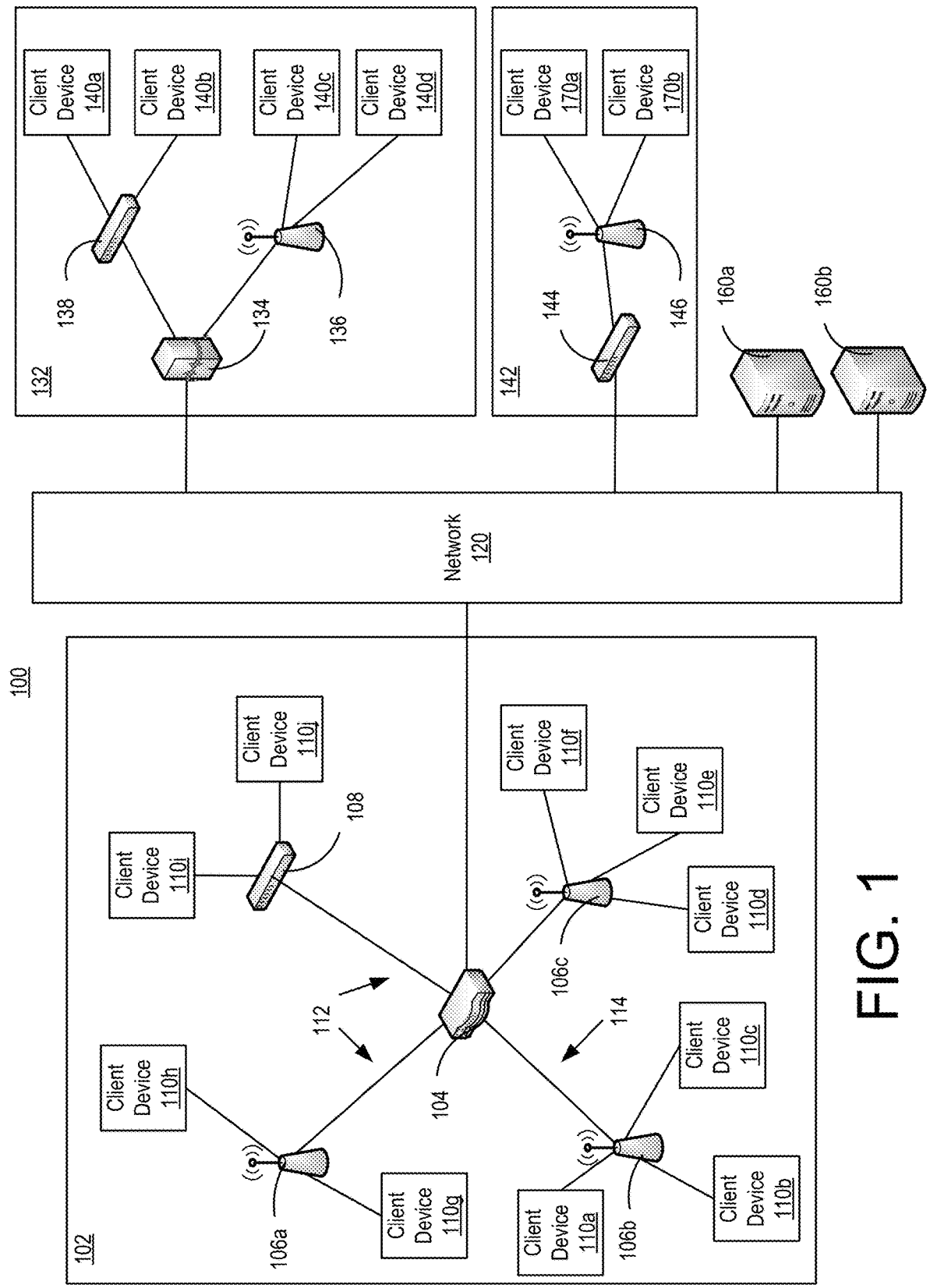
FIG. 1 illustrates one example of a network configuration

The figures are not exhaustive and do not limit the present disclosure to the precise form disclosed.

DETAILED DESCRIPTION

Embodiments of the present disclosure provide configuration updates for network devices using rankings and health scores of the devices. Updating the configurations of network devices represents one of the most important and challenging operations in the information technology industry. Any error during a network device configuration update may lead to loss of business for the customer. Simply turning a feature on or off for network devices may result in a significant disruption for the customer. For example, changing a cryptographic engine from a hardware engine to a software engine may suddenly increase the CPU usage of the network devices, resulting in a sudden increase in latency for the connected network. Disabling the jumbo packet feature for network devices may decrease the throughput of the network. Disabling a memory-intensive feature may cause an out-of-memory condition, resulting in a network crash.

As another example, a change in routing protocol, such as stopping caching, may lead to dropped packets across various network queues, resulting in increased latency or layer-3 disconnect. Furthermore, some configuration problems are seen only with particular topologies, or combinations of network device models, and are therefore missed during internal testing, only to reveal themselves during deployment of the configuration update.

Furthermore, the above problems may be exacerbated in certain scenarios. For example, in a hierarchical organization, configuration is a multi-level operation. For example, a two-level hierarchy may feature a global configuration for a master controller, as well as a local configuration for local controllers that are controlled by the master controller. The master controller also consumes some or all of the local configuration. Therefore, any error in the global configuration may affect the entire network of the organization. A centralized organization, having only a single configuration, suffers the same problem.

Another scenario features a large number of administrative users, in addition to guest users, for example in an airport deployment, stadium deployment, and the like. An airport deployment includes a large number of administrative users who are using the network to coordinate aircraft-related activities, in addition to a large number of guest users accessing the network for entertainment, business, and the like. Any impact to the administrative users may have a significant effect on the business and safety of the airport.

Another scenario features multiple user groups having different privileges. For example, a deployment in a multi-story office building may include guest users on one floor, moderately-privileged users on another floor, and highly-privileged users such as C-level executives, sales, and customer support on still another floor. Any impact to the moderately-privileged or highly-privileged users may have a significant impact on the business.

In conventional processes for applying network device configuration updates, the updates are generally pushed to all devices in the network at the same time. This approach not only multiplies the adverse effects of any configuration error, as described above, but also magnifies the complexity of detecting the error, especially with hierarchical organizations, where multiple levels of configuration are updated at the same time.

Embodiments of the disclosed technology solve these problems by ranking the network devices, deploying the configuration updates to the least important devices first, and comparing the health of each network device before and after the update. When any significant health degradation is detected, the configuration update is halted and rolled back for any network devices that have been updated. In this manner, any configuration update error is detected early in the configuration update process, thereby minimizing adverse effects of the errors. This approach also simplifies the process of debugging configuration update errors by limiting the pool of configuration updates and network devices that must be checked.

Before describing embodiments of the disclosed systems and methods in detail, it is useful to describe a network with which these systems and methods might be implemented in various applications. FIG. 1 illustrates one example of a network configuration 100 that may be implemented for an organization, such as a business, educational institution, governmental entity, healthcare facility or other organization. This diagram illustrates an example of a configuration implemented with an organization having multiple users (or at least multiple client devices 110) and possibly multiple physical or geographical sites 102, 132, 142. The network configuration 100 may include a primary site 102 in communication with a network 120. The network configuration 100 may also include one or more remote sites 132, 142, that are in communication with the network 120.

The primary site 102 may include a primary network (not shown), which can be, for example, an office network, home network or other network installation. The primary site 102 network may be a private network, such as a network that may include security and access controls to restrict access to authorized users of the private network. Authorized users may include, for example, employees of a company at primary site 102, residents of a house, customers at a business, and so on.

In the illustrated example, the primary site 102 includes a controller 104 in communication with the network 120. The controller 104 may provide communication with the network 120 for the primary site 102, though it may not be the only point of communication with the network 120 for the primary site 102. A single controller 104 is illustrated, though the primary site may include multiple controllers and/or multiple communication points with network 120. In some embodiments, the controller 104 communicates with the network 120 through a router (not illustrated). In other embodiments, the controller 104 provides router functionality to the devices in the primary site 102.

A controller 104 may be operable to configure and manage network devices, such as at the primary site 102, and may also manage network devices at the remote sites 132, 142. The controller 104 may be operable to configure and/or manage switches, routers, access points, and/or client devices connected to a network. The controller 104 may itself be, or provide the functionality of, an access point.

The controller 104 may be in communication with one or more switches 108 and/or wireless Access Points (Aps) 106a-c. Switches 108 and wireless APs 106a-c provide network connectivity to various client devices 110a-j. Using a connection to a switch 108 or AP 106a-c, a client device 110a-j may access network resources, including other devices on the (primary site 102) network and the network 120.

Examples of client devices may include: desktop computers, laptop computers, servers, web servers, authentication servers, authentication-authorization-accounting (AAA) servers, Domain Name System (DNS) servers, Dynamic Host Configuration Protocol (DHCP) servers, Internet Protocol (IP) servers, Virtual Private Network (VPN) servers, network policy servers, mainframes, tablet computers, e-readers, netbook computers, televisions and similar monitors (e.g., smart TVs), content receivers, set-top boxes, personal digital assistants (PDAs), mobile phones, smart phones, smart terminals, dumb terminals, virtual terminals, video game consoles, virtual assistants, Internet of Things (IOT) devices, and the like.

Within the primary site 102, a switch 108 is included as one example of a point of access to the network established in primary site 102 for wired client devices 110i-j. Client devices 110i-j may connect to the switch 108 and through the switch 108, may be able to access other devices within the network configuration 100. The client devices 110i-j may also be able to access the network 120, through the switch 108. The client devices 110i-j may communicate with the switch 108 over a wired 112 connection. In the illustrated example, the switch 108 communicates with the controller 104 over a wired 112 connection, though this connection may also be wireless.

Wireless APs 106a-c are included as another example of a point of access to the network established in primary site 102 for client devices 110a-h. Each of APs 106a-c may be a combination of hardware, software, and/or firmware that is configured to provide wireless network connectivity to wireless client devices 110a-h. In the illustrated example, APs 106a-c can be managed and configured by the controller 104. APs 106a-c communicate with the controller 104 and the network over connections 112, which may be either wired or wireless interfaces.

The network configuration 100 may include one or more remote sites 132. A remote site 132 may be located in a different physical or geographical location from the primary site 102. In some cases, the remote site 132 may be in the same geographical location, or possibly the same building, as the primary site 102, but lacks a direct connection to the network located within the primary site 102. Instead, remote site 132 may utilize a connection over a different network, e.g., network 120. A remote site 132 such as the one illustrated in FIG. 1 may be, for example, a satellite office, another floor or suite in a building, and so on. The remote site 132 may include a gateway device 134 for communicating with the network 120. A gateway device 134 may be a router, a digital-to-analog modem, a cable modem, a Digital Subscriber Line (DSL) modem, or some other network device configured to communicate to the network 120. The remote site 132 may also include a switch 138 and/or AP 136 in communication with the gateway device 134 over either wired or wireless connections. The switch 138 and AP 136 provide connectivity to the network for various client devices 140a-d.

In various embodiments, the remote site 132 may be in direct communication with primary site 102, such that client devices 140a-d at the remote site 132 access the network resources at the primary site 102 as if these clients devices 140a-d were located at the primary site 102. In such embodiments, the remote site 132 is managed by the controller 104 at the primary site 102, and the controller 104 provides the necessary connectivity, security, and accessibility that enable the remote site 132's communication with the primary site 102. Once connected to the primary site 102, the remote site 132 may function as a part of a private network provided by the primary site 102.

In various embodiments, the network configuration 100 may include one or more smaller remote sites 142, comprising only a gateway device 144 for communicating with the network 120 and a wireless AP 146, by which various client devices 150a-b access the network 120. Such a remote site 142 may represent, for example, an individual employee's home or a temporary remote office. The remote site 142 may also be in communication with the primary site 102, such that the client devices 150a-b at remote site 142 access network resources at the primary site 102 as if these client devices 150a-b were located at the primary site 102. The remote site 142 may be managed by the controller 104 at the primary site 102 to make this transparency possible. Once connected to the primary site 102, the remote site 142 may function as a part of a private network provided by the primary site 102.

The network 120 may be a public or private network, such as the Internet, or other communication network to allow connectivity among the various sites 102, 130 to 142 as well as access to servers 160a-b. The network 120 may include third-party telecommunication lines, such as phone lines, broadcast coaxial cable, fiber optic cables, satellite communications, cellular communications, and the like. The network 120 may include any number of intermediate network devices, such as switches, routers, gateways, servers, and/or controllers, which are not directly part of the network configuration 100 but that facilitate communication between the various parts of the network configuration 100, and between the network configuration 100 and other network-connected entities. The network 120 may include various content servers 160a-b. Content servers 160a-b may include various providers of multimedia downloadable and/or streaming content, including audio, video, graphical, and/or text content, or any combination thereof. Examples of content servers 160a-b include, for example, web servers, streaming radio and video providers, and cable and satellite television providers. The client devices 110a-j, 140a-d, 150a-b may request and access the multimedia content provided by the content servers 160a-b.

Figure 2:
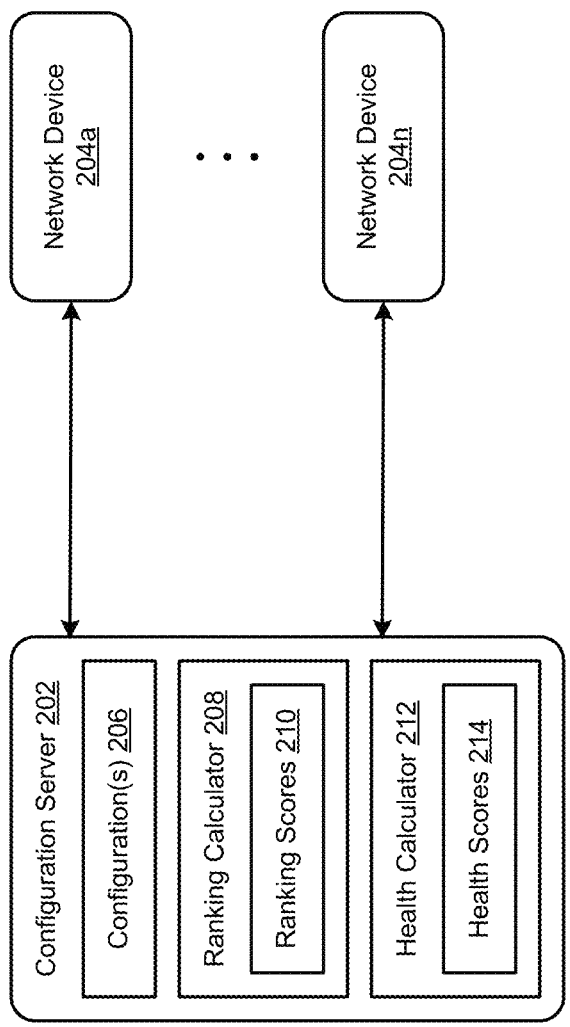
FIG. 2 illustrates a system for applying configuration updates to network devices according to embodiments of the disclosed technology.

Having described an example network installation above, particular embodiments of the disclosed technology will now be described. FIG. 2 illustrates a system for applying configuration updates to network devices according to embodiments of the disclosed technology. Referring to FIG. 2, the system includes a configuration server 202 that is in communication with a plurality of network devices 204a through 204n. The network devices 204 may include, for example, access points, Internet access points, controllers, switches, and the like.

The configuration server 202 may store one or more configurations 206 to be applied to the network devices. The configurations 206 may be stored as files in a memory of the configuration server 202. The configurations 206 may be applied to the network devices 204 as part of a configuration update process, as described in detail below.

The configuration server 202 may include a ranking calculator 208. As described in detail below, the ranking calculator 208 ranks the network devices 204 according to their importance. For example, the ranking calculator 208 may calculate a ranking score 210 for each network device 204, and may store the ranking scores 210 in the configuration server 202. During a configuration update, the network devices 204 are updated with the configurations 206 according to their ranking scores 210, as described in detail below. For example, the network devices 204 may be updated in rank order, from least important to most important. In this manner, when a problem is encountered during a configuration update of a network device 204, more important network devices 204 are largely unaffected.

The configuration server 202 may also include a health calculator 212. As described in detail below, the health calculator 212 may calculate a health for each network device 204. For example, the health calculator 212 may calculate a health score 214 for each network device 204, and may store the health scores 214 in the configuration server 202. The health scores 214 may be employed to determine whether a configuration update has adversely affected a network device 204. That is, the health score 214 for a network device 204 following a configuration update may be compared to a stored health score 214 obtained prior to the configuration update. A significant decline in the health score 214 for a network device 204 may indicate an error in the configuration 206 applied to that network device 204 during the configuration update. In such a case, the configuration 206 may be rolled back. That is, the configuration for the network device 204 may be restored to its state prior to the configuration update.

Figure 3:
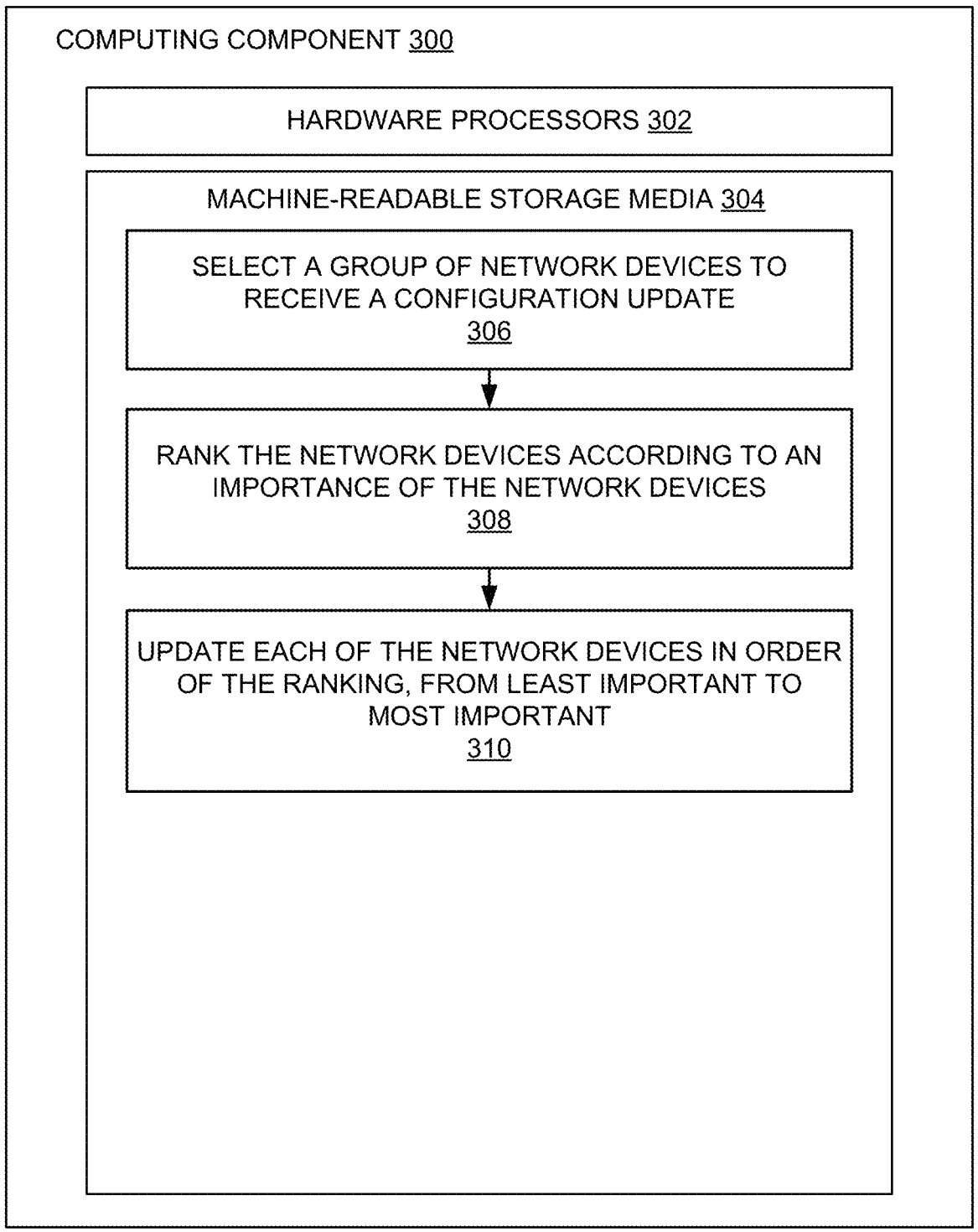
FIG. 3 is a block diagram of an example computing component or device for updating configurations of network devices in accordance with one embodiment.

FIG. 3 is a block diagram of an example computing component or device 300 for updating configurations of network devices in accordance with one embodiment. Computing component 300 may be, for example, a server computer, a controller, or any other similar computing component capable of processing data. In the example implementation of FIG. 3, the computing component 300 includes a hardware processor 302, and machine-readable storage medium 304. In some embodiments, computing component 300 may be an embodiment of the configuration server 202, the network devices 204, other network components, or any combination thereof.

Hardware processor 302 may be one or more central processing units (CPUs), semiconductor-based microprocessors, and/or other hardware devices suitable for retrieval and execution of instructions stored in machine-readable storage medium, 304. Hardware processor 302 may fetch, decode, and execute instructions, such as instructions 306-310, to control processes or operations for updating configurations of network devices. As an alternative or in addition to retrieving and executing instructions, hardware processor 302 may include one or more electronic circuits that include electronic components for performing the functionality of one or more instructions, such as a field programmable gate array (FPGA), application specific integrated circuit (ASIC), or other electronic circuits.

A machine-readable storage medium, such as machine-readable storage medium 304, may be any electronic, magnetic, optical, or other physical storage device that contains or stores executable instructions. Thus, machine-readable storage medium 304 may be, for example, Random Access Memory (RAM), non-volatile RAM (NVRAM), an Electrically Erasable Programmable Read-Only Memory (EEPROM), a storage device, an optical disc, and the like. In some embodiments, machine-readable storage medium 304 may be a non-transitory storage medium, where the term "non-transitory" does not encompass transitory propagating signals. As described in detail below, machine-readable storage medium 304 may be encoded with executable instructions, for example, instructions 306-310. Depending on the implementation, the instructions may include additional, fewer, or alternative instructions, and may be performed in various orders or in parallel.

Hardware processor 302 may execute instructions 306 to select a group of network devices to receive a configuration update. For example, referring to FIG. 2, one or more of the network devices 204 may be selected to receive one or more of the configurations 206 stored in the configuration server 202. The group of network devices 204 may be selected in any manner. For example, when a new configuration 206 is available for a particular make and model of network device 204, all of those devices may be selected. As another example, all of the network devices 204 on a particular floor of an office building may be selected. As another example, all of the network devices 204 associated with a particular organization, region, or branch may be selected. Embodiments of the disclosed technology are independent of the manner in which the group of network devices 204 selected.

Hardware processor 302 may execute instructions 308 to rank the selected network devices according to an importance of the network devices. For example, referring to FIG. 2, the ranking calculator 208 of the configuration server 202 may generate a respective ranking score 210 for each of the network devices 204. These ranking scores 210 may be stored in the configuration server 202.

In some embodiments, calculating a ranking score 210 for a network device 204 may include calculating a function of one or more values. Several example values are described below. However, it should be understood that any values may be used. Embodiments of the disclosed technology are independent of the particular values employed.

One value may represent a priority of a location of the network device 204. This value may be high for a high-priority location. A priority of a location may be determined in any manner. For example, a physical location where critical business tasks are executed may be designated as a high-priority location. Such a physical location may include a location where critical personnel are located, such as C-level executives, sales, technical support, and the like. The priority of the location may be assigned by network administrator.

One of the values may represent a priority of one or more users of the network device 204. For example, this value may be high for an access point used by C-level executives.

One of the values may represent a role of one or more users of the network device 204. For example, this value may represent a rank of a user of the network device 204. A C-level role may receive a high score, while a guest user may receive a low score. These scores may be set by a network administrator, obtained through an identity and access management product, or the like.

One of the values may represent a reputation of one or more users of the network device 204. Each user reputation may be based on, for example, a degree and an amount of malicious content accessed by the respective user.

One of the values may represent a bandwidth of the network device 204. For example, a high value may be assigned to a network device 204 with a high bandwidth utilization.

One of the values may represent a priority of traffic flows of the network device 204. For example, a high value may be assigned to a network device 204 handling high-priority traffic flows.

One of the values may represent a user connection time of the network device 204. For example, a high value may be assigned to a network device 204 having a high average user connection duration time. Calculating the function of the one or more values may include generating a weighted sum of the plurality of the values. That is, a respective weight may be assigned to each of the values for a network device 204. The weighted values may be summed to generate the ranking score for the network device 204. The weights for the values may be selected in any manner. In one example, the weights may be assigned by a domain expert or the like.

Hardware processor 302 may execute instructions 310 to update each of the network devices in order of the ranking, from least important to most important. This update process is described in greater detail with reference to FIG. 4.

Figure 4:
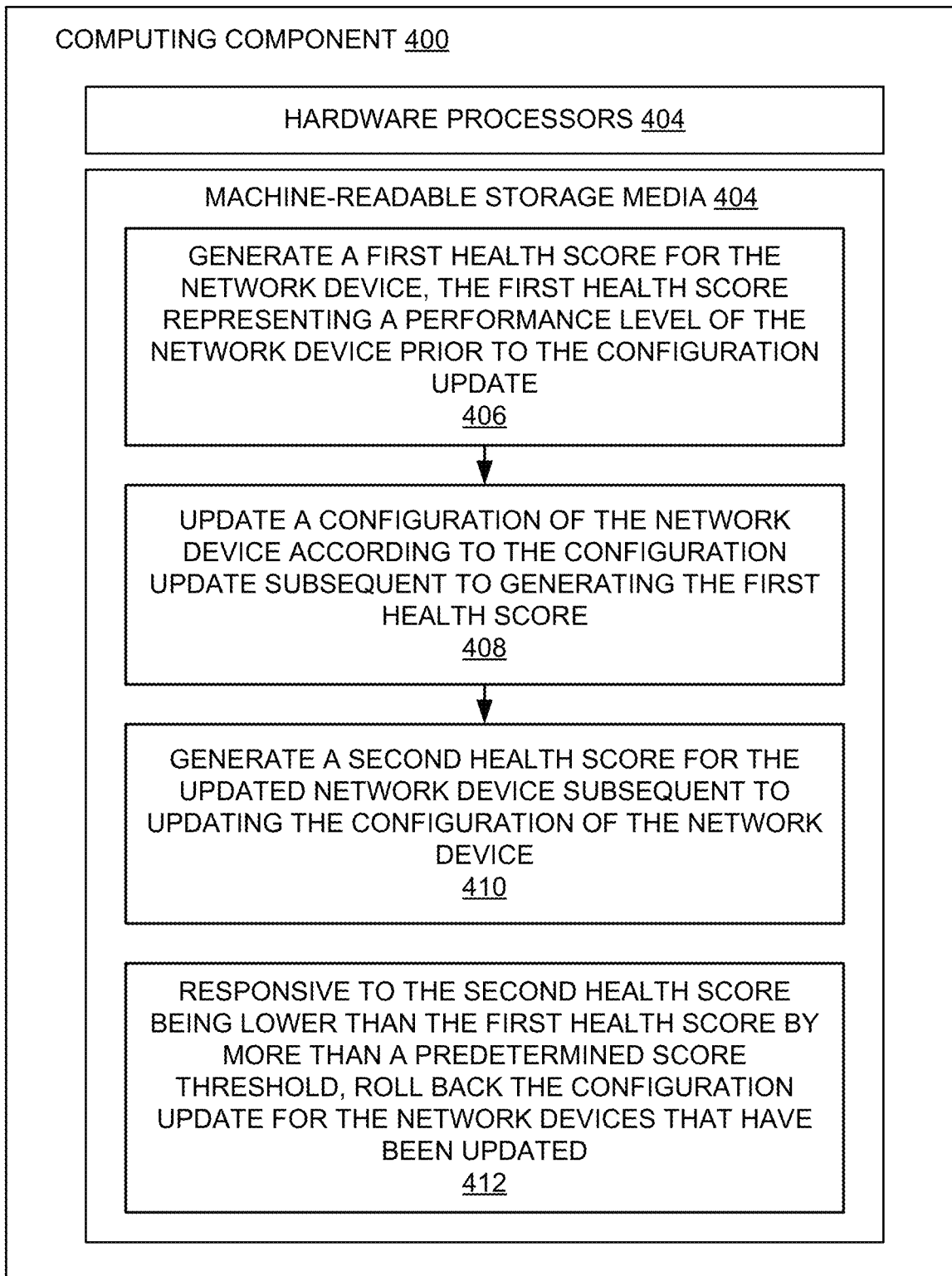
FIG. 4 is a block diagram of an example computing component or device for updating a network device in accordance with one embodiment.

FIG. 4 is a block diagram of an example computing component or device 400 for updating a network device in accordance with one embodiment. Computing component 400 may be, for example, a server computer, a controller, or any other similar computing component capable of processing data. In the example implementation of FIG. 4, the computing component 400 includes a hardware processor 402, and machine-readable storage medium 404. These components may be implemented as described above for the example computing component or device 300 of FIG. 3. In some embodiments, computing component 400 may be an embodiment of the configuration server 202, the network devices 204, other network components, or any combination thereof.

Hardware processor 402 may execute instructions 406 to generate a first health score for the network device. The first health score may represent a performance level of the network device prior to a configuration update. For example, referring to FIG. 2, the health calculator 212 of the configuration server 202 may generate the first health score 214 for a network device 204 prior to applying the configuration 206 to the network device 204.

In some embodiments, calculating a health score 214 for a network device 204 may include calculating a function of one or more values. In some embodiments, the function may be a weighted sum of the values, for example such as described below with reference to equation (2). In some embodiments, the values are normalized prior to calculating the function, for example as described below. In some embodiments, a baselining process may be employed to eliminate values that may be considered erroneous outliers, for example as described below. In some embodiments, ordinal variables are used. In such embodiments, techniques such as ordinal regression may be used to establish weights for the ordinal variables, for example as described below. Several example values are described below. However, it should be understood that any values may be used. Embodiments of the disclosed technology are independent of the particular values employed.

One value may represent an interface connectivity of the network device 204. The interface connectivity value may be determined based on one or more metrics. Example metrics may represent a degree of connectivity to a domain name server (DNS), a dynamic host configuration protocol (DHCP) server, a network such as the Internet, a neighboring layer-2 network device, a neighboring layer-3 network device, and the like.

One value may represent a quality of service of the network device 204. The qualities of service value may be determined based on one or more metrics. Example metrics may represent, for network related receive and transmit queues of the network device 204, jitter, packet loss, latency, available bandwidth of the links of the network device 204, and the like.

One value may represent a performance of a hardware component of the network device 204. The value may be determined based on one or more metrics. Example metrics may represent CPU load, physical memory usage, disk space, power or temperature events, cryptographic engine throughput, and the like.

One value may represent a performance of a software component of the network device 204. The value may be determined based on one or more metrics. Example metrics may represent application and system errors. New errors should not suddenly appear after a configuration update. These errors can be observed by parsing various applications and systems with commercially-available tools. Other example metrics may represent a number of client connections. If the number of client connections falls to zero after configuration update, an error in the configuration 206 is likely. Other example metrics may include control plane and data plane related parameters.

One value may represent a security performance of the network device 204. This value may be based on one or more metrics. Example metrics may include the number of open ports, destination Internet protocol addresses, and countries and other geographical zones of traffic handled by the network device 204. These metrics may be obtained by observing known patterns in fields such as user-agent, Internet protocol, domain, and the like, and scoring these patterns using commercially-available tools.

Hardware processor 402 may execute instructions 408 to update a configuration of the network devices according to the configuration update subsequent to generating the first health score. For example, referring to FIG. 2, the configuration server 202 may apply one of the configurations 206 to the network device 204 after generating the first health score 214 for the network device 204.

Hardware processor 402 may execute instructions 410 to generate a second health score for the updated network devices subsequent to updating the configuration of the network device. The second health score may be generated as described above for the first health score.

Hardware processor 402 may execute instructions 412 to rollback the configuration update for the network devices that have been updated responsive to the second health score being lower than the first health score by more than a predetermined health score threshold. The health score thresholds may be established in any manner.

For example, referring to FIG. 2, the configuration server 202 may determine that the health score 214 of the network device 204 following application of the configuration 206 to the network device 204 has fallen significantly, which is indicative of an error in the configuration 206. The configuration server 202 therefore rolls back the configuration update for that network device 204. That is, the configuration server 202 restores the network device 204 to the configuration that existed prior to application of the configuration 206. The configuration server 202 may also rollback the configuration update for any other network devices 204 that have been updated with one of the configurations 206 during the current configuration update.

At this point, the configuration server 202 has knowledge of which particular configuration 206 is responsible for the degradation of the health of the network device 204, as well as the identity of that network device 204. This information may be provided to technicians for debugging the respective configuration 206.

However, if the configuration server 202 determines that the health score for the network device 204 has not fallen by more than the health score threshold, the configuration update process may resume, for example as described in FIG. 3.

In some embodiments, the metrics and values described above as inputs to the calculation of the ranking scores 210 and health scores 214 may be normalized prior to those calculations. Any normalization technique may be used. Embodiments of the disclosed technology are independent of the normalization technique employed. For example, probability density functions may be used to place each metric and/or value within a common range, for example 0 to 100.

In some embodiments, the ranking calculator 208 of the configuration server 202 may normalize the constituent values of a score prior to calculating that score. Normalization may be implemented prior to calculating the ranking scores 210, the health scores 214, or both. An example normalization technique according to some embodiments of the disclosed technology is now described. However, any normalization technique may be used.

Normalization is especially useful when the magnitudes of the values vary significantly. For example, an interface connectivity value may fall in the range 0-5, while a software performance value may fall in the range 0-1000. Prior to combining these values, they may be normalized, for example so that both fall in the range 0-100. In this example, the values are normalized using the standard Z-score formula, shown in equation (1), where x is the value of the metric, u is the mean, and sdev is the standard deviation.

$$Z=(x-u)/\text{sdev} \quad (1)$$

Figure 5:
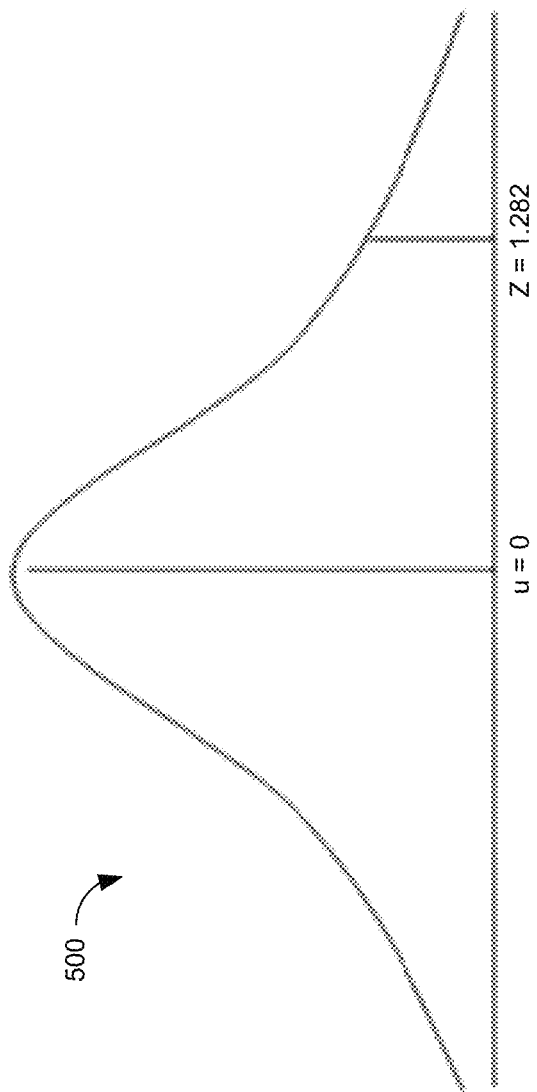
FIG. 5 illustrates a probability curve for example probability density function, for use in normalizing constituent values of ranking and health scores according to embodiments of the disclosed technology.

The resulting Z-score may be converted to a percentile using a probability density function, so as to fall in the range of 0-100. This conversion is illustrated in FIG. 5. Referring to FIG. 5, a probability curve 500 is shown for an example probability density function, along with an example Z score of Z=1.282. The area under the probability curve describes the percentile, which falls in the desired range of 0-100.

In some embodiments, the relative change of a metric is known, but its value is unknown. For example, the value of a drop in bandwidth of a network device following a configuration update may be known, while the value of the bandwidth itself may not be known. In such embodiments, the weight applied to the value may be calculated by ordinal regression or the like.

Ordinal regression is a technique for predicting ordinal variables. An ordinal variable is a variable that exists on an arbitrary scale where only the relative ordering between the values is significant. Accordingly, ordinal regression is particularly useful when only the change in a value is known. In some embodiments, ordinal regression may be implemented using a machine learning model. In other embodiments, other machine learning models may be used in place of, or in addition to, ordinal regression. The model may be trained using the ranking parameters and/or weights used during a previous upgrade as training data.

In the disclosed embodiments, ordinal regression may be implemented prior to calculating the ranking scores 210, the health scores 214, or both. For example, consider a health score (HS) 214 that is calculated according to equation (2).

$$HS = w1*\text{Iconn} + w2*\text{IQoS} + w3*\text{HcoP} + w4*\text{SoP} + w5*\text{Esec} \quad (2)$$

In equation (2), the constituent values of the health score (HS) are represented by the variables (conn, IQoS, HcoP, SoP, and Esec, and the weights are represented by the variables w1, w2, w3, w4, and w5. Ordinal regression may be employed to determine the values for these weights. For example, for ordinal Label Rank with c categories, the function P(Rank=j), j=1, 2, ... c, depends on a feature Xi, which can be categorical and/or quantitative. For categorical features, indicator variables can be used. In some scenarios, the ordinal regression operations may include computing a cumulative Logit model with proportional odds.

For determining the weights w1, w2, w3, w4, or w5, the feature Xi can be set to be Iconn, IQoS, HcoP, SoP, and or Esec. In this example, rank may be based on criticality. Training data as noted above can be used in the ordinal regression to calculate the weights. Examples of training data that can be used for training the model are shown in Table 1 below.

TABLE 1

| Iconn | IQos | HcoP | SoP | Esec |
|-------|------|------|-----|------|
| 0.3 | 0.4 | 0.6 | 0.8 | 0.1 |
| 0.4 | 0.5 | 0.7 | 0.9 | 0.4 |
| 0.6 | 0.7 | 0.9 | 0.8 | 0.8 |

Once this model has been trained, the model can be used to calculate the weights. The weights may then be used in calculating the health score 214.

In some embodiments, one or more of the disclosed thresholds are generated according to a baselining process. The baselining process provides the most common behavior and values for the metrics, and excludes rare phenomena. In some embodiments, the baselining process is used to generate thresholds for individual health metrics, and these thresholds are then aggregated to form the health score threshold. The thresholds may be generated only once, or may be tuned occasionally or periodically as an ongoing process. Multiple thresholds may be generated, for example such as multiple upper and lower thresholds. The baselining process may process metrics over a sliding window having a determined duration, for example such as one day, 30 days, or the like. The duration of the window may be set based on the interval to be characterized. For example, to characterize daily behavior, a one-week window may be used.

The process may use a one class support vector machine, for example using two parameters gamma and nu. Gamma controls the number of decision thresholds. For example, a small value of gamma, for example gamma=0.1, usually returns fewer decision thresholds, while large values of gamma, for example gamma>1, usually returns many decision thresholds. The nu parameter controls the percentage of data considered to be outliers. For example, nu may be set at nu=0.1%, nu=10%, and the like.

Figure 6:
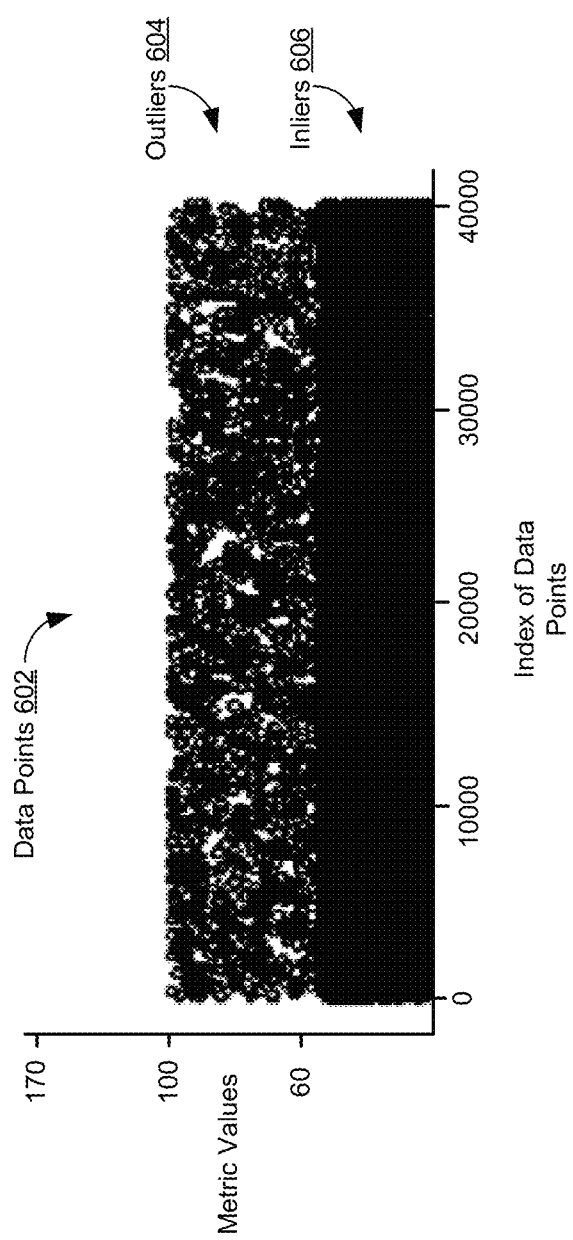
FIG. 6 illustrates a health score baseline graphically.

FIG. 6 illustrates an example health score baseline graphically. Referring to FIG. 6, a plurality of data points 602 are plotted as an index of the data point vs. values of the metric represented. As can be seen in FIG. 6, the outliers 604 have relatively high values, while the inliers 606 have relatively low values. The boundary between the inliers 606 and the outliers 604 defines the baseline.

Figure 7:
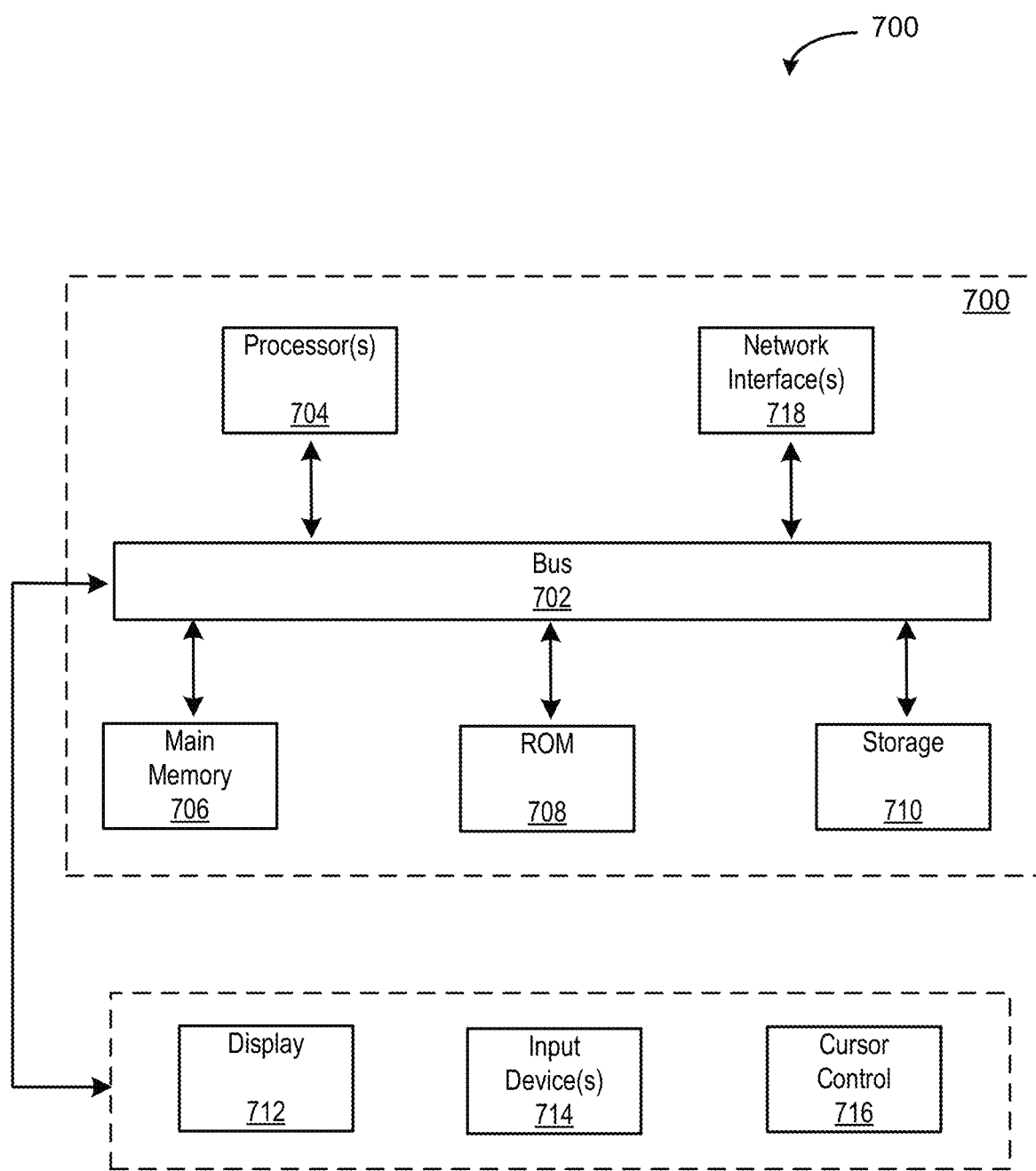
FIG. 7 is an example computing component that may be used to implement various features of embodiments described in the present disclosure.

FIG. 7 depicts a block diagram of an example computer system 700 in which embodiments described herein may be implemented. The computer system 700 includes a bus 702 or other communication mechanism for communicating information, one or more hardware processors 704 coupled with bus 702 for processing information. Hardware processor(s) 704 may be, for example, one or more general purpose microprocessors.

The computer system 700 also includes a main memory 706, such as a random access memory (RAM), cache and/or other dynamic storage devices, coupled to bus 702 for storing information and instructions to be executed by processor 704. Main memory 706 also may be used for storing temporary variables or other intermediate information during execution of instructions to be executed by processor 704. Such instructions, when stored in storage media accessible to processor 704, render computer system 700 into a special-purpose machine that is customized to perform the operations specified in the instructions.

The computer system 700 further includes a read only memory (ROM) 708 or other static storage device coupled to bus 702 for storing static information and instructions for processor 704. A storage device 710, such as a magnetic disk, optical disk, or USB thumb drive (Flash drive), etc., is provided and coupled to bus 702 for storing information and instructions.

The computer system 700 may be coupled via bus 702 to a display 712, such as a liquid crystal display (LCD) (or touch screen), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. In some embodiments, the same direction information and command selections as cursor control may be implemented via receiving touches on a touch screen without a cursor.

The computing system 700 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database," data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor(s) 704 executing one or more sequences of one or more instructions contained in main memory 706. Such instructions may be read into main memory 706 from another storage medium, such as storage device 710. Execution of the sequences of instructions contained in main memory 706 causes processor(s) 704 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 710. Volatile media includes dynamic memory, such as main memory 706. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 702. Transmission media can also take the form of acoustic or light waves, such as those generated during radio-wave and infra-red data communications.

The computer system 700 also includes a communication interface 718 coupled to bus 702. Network interface 718 provides a two-way data communication coupling to one or more network links that are connected to one or more local networks. For example, communication interface 718 may be an integrated services digital network (ISDN) card, cable modem, satellite modem, or a modem to provide a data communication connection to a corresponding type of telephone line. As another example, network interface 718 may be a local area network (LAN) card to provide a data communication connection to a compatible LAN (or a WAN component to communicate with a WAN). Wireless links may also be implemented. In any such implementation, network interface 718 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through communication interface 718, which carry the digital data to and from computer system 700, are example forms of transmission media.

The computer system 700 can send messages and receive data, including program code, through the network(s), network link and communication interface 718. In the Internet example, a server might transmit a requested code for an application program through the Internet, the ISP, the local network and the communication interface 718.

The received code may be executed by processor 704 as it is received, and/or stored in storage device 710, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, a circuit might be implemented utilizing any form of hardware, or a combination of hardware and software. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 700.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A system comprising:
  a hardware processor; and
  a non-transitory machine-readable storage medium encoded with instructions executable by the hardware processor to perform a method comprising:
    selecting a group of network devices to receive a configuration update;
    ranking the network devices according to an importance of the network devices;
    updating each of the network devices in order of the ranking, from least important to most important, comprising:
      generating a first health score for the network device, the first health score representing a performance level of the network device prior to the configuration update;
      updating a configuration of the network device according to the configuration update subsequent to generating the first health score;
      generating a second health score for the updated network device subsequent to updating the configuration of the network device; and
      responsive to the second health score being lower than the first health score by more than a predetermined score threshold, rolling back the configuration update for the network devices that have been updated.

2. The system of claim 1, wherein ranking the network devices according to the importance of the network devices comprises:
generating a respective ranking score for each of the network devices, each ranking score reflecting a relative importance of the network device in the network, the lowest ranking score in the group indicating the least important network device in the group.

3. The system of claim 2, wherein updating each of the network devices in order of the ranking, from least important to most important, comprises:
updating each of the network devices in order of the ranking scores, from the lowest ranking score to the highest ranking score.

4. The system of claim 2, wherein generating one of the ranking scores for one of the network devices comprises:
calculating a function of one or more values, wherein the one or more values represent one or more of:
a priority of a location of the network device,
a priority of one or more users of the network device,
a role of one or more users of the network device,
a reputation of one or more users of the network device, each reputation being based on at least one of a degree and an amount of malicious content accessed by the respective user,
a bandwidth of the network device,
a priority of traffic flows of the network device, and
a user connection time of the network device.

5. The system of claim 4, wherein:
the one or more values comprise a plurality of the values; and
calculating the function of the one or more values comprises generating a weighted sum of the plurality of the values.

6. The system of claim 1, wherein generating one of the health scores for one of the network devices comprises:
calculating a function of one or more values, wherein the one or more values represent one or more of:
an interface connectivity of the network device,
a quality of service of the network device,
a performance of a hardware component of the network device,
a performance of a software component of the network device, and
a security performance of the network device.

7. The system of claim 6, wherein:
the one or more values comprise a plurality of the values; and
calculating the function of the one or more values comprises generating a weighted sum of the plurality of the values.

8. A non-transitory machine-readable storage medium encoded with instructions executable by a hardware processor of a computing component, the machine-readable storage medium comprising instructions to cause the hardware processor to perform a method comprising:
selecting a group of network devices to receive a configuration update;
ranking the network devices according to an importance of the network devices;
updating each of the network devices in order of the ranking, from least important to most important, comprising:
generating a first health score for the network device, the first health score representing a performance level of the network device prior to the configuration update;
updating a configuration of the network device according to the configuration update subsequent to generating the first health score;
generating a second health score for the updated network device subsequent to updating the configuration of the network device; and
responsive to the second health score being lower than the first health score by more than a predetermined score threshold, rolling back the configuration update for the network devices that have been updated.

9. The medium of claim 8, wherein ranking the network devices according to the importance of the network devices comprises:
generating a respective ranking score for each of the network devices, each ranking score reflecting a relative importance of the network device in the network, the lowest ranking score in the group indicating the least important network device in the group.

10. The medium of claim 9, wherein updating each of the network devices in order of the ranking, from least important to most important, comprises:
updating each of the network devices in order of the ranking scores, from the lowest ranking score to the highest ranking score.

11. The medium of claim 9, wherein generating one of the ranking scores for one of the network devices comprises:
calculating a function of one or more values, wherein the one or more values represent one or more of:
a priority of a location of the network device,
a priority of one or more users of the network device,
a role of one or more users of the network device,
a reputation of one or more users of the network device, each reputation being based on at least one of a degree and an amount of malicious content accessed by the respective user,
a bandwidth of the network device,
a priority of traffic flows of the network device, and
a user connection time of the network device.

12. The medium of claim 11, wherein:
the one or more values comprise a plurality of the values; and
calculating the function of the one or more values comprises generating a weighted sum of the plurality of the values.

13. The medium of claim 8, wherein generating one of the health scores for one of the network devices comprises:
calculating a function of one or more values, wherein the one or more values represent one or more of:
an interface connectivity of the network device,
a quality of service of the network device,
a performance of a hardware component of the network device,
a performance of a software component of the network device, and
a security performance of the network device.

14. The medium of claim 13, wherein:
the one or more values comprise a plurality of the values; and
calculating the function of the one or more values comprises generating a weighted sum of the plurality of the values.

15. A method comprising:
selecting a group of network devices to receive a configuration update;
ranking the network devices according to an importance of the network devices;

updating each of the network devices in order of the ranking, from least important to most important, comprising:
  generating a first health score for the network device, the first health score representing a performance level of the network device prior to the configuration update;
  updating a configuration of the network device according to the configuration update subsequent to generating the first health score;
  generating a second health score for the updated network device subsequent to updating the configuration of the network device; and
  responsive to the second health score being lower than the first health score by more than a predetermined score threshold, rolling back the configuration update for the network devices that have been updated.

16. The method of claim 15, wherein ranking the network devices according to the importance of the network devices comprises:
  generating a respective ranking score for each of the network devices, each ranking score reflecting a relative importance of the network device in the network, the lowest ranking score in the group indicating the least important network device in the group.

17. The method of claim 16, wherein updating each of the network devices in order of the ranking, from least important to most important, comprises:
  updating each of the network devices in order of the ranking scores, from the lowest ranking score to the highest ranking score.

18. The method of claim 16, wherein generating one of the ranking scores for one of the network devices comprises:
  calculating a function of one or more values, wherein the one or more values represent one or more of:
    a priority of a location of the network device,
    a priority of one or more users of the network device,
    a role of one or more users of the network device,
    a reputation of one or more users of the network device, each reputation being based on at least one of a degree and an amount of malicious content accessed by the respective user,
    a bandwidth of the network device,
    a priority of traffic flows of the network device, and
    a user connection time of the network device.

19. The method of claim 18, wherein:
  the one or more values comprise a plurality of the values; and
  calculating the function of the one or more values comprises generating a weighted sum of the plurality of the values.

20. The method of claim 15, wherein generating one of the health scores for one of the network devices comprises:
  calculating a function of one or more values, wherein the one or more values represent one or more of:
    an interface connectivity of the network device,
    a quality of service of the network device,
    a performance of a hardware component of the network device,
    a performance of a software component of the network device, and
    a security performance of the network device.

* * * * *